United States Patent

[11] 3,595,041

| [72] | Inventor | John E. Leeper<br>211 East Columbia St., Evansville, Ind. 47710 |
|---|---|---|
| [21] | Appl. No. | 878,267 |
| [22] | Filed | Nov. 20, 1969 |
| [45] | Patented | July 27, 1971 |

[54] LOCKING ARRANGEMENT
4 Claims, 4 Drawing Figs.

[52] U.S. Cl................................................. 70/232,
70/58, 70/258, 248/203
[51] Int. Cl....................................................E05b73/00,
F16b 41/00
[50] Field of Search............................................ 70/58, 232,
416, DIG. 57, DIG. 58, 258, 259; 211/4; 248/203

[56] References Cited
UNITED STATES PATENTS

| 2,529,432 | 11/1950 | Tenner.......................... | 70/232 |
| 2,556,900 | 6/1951 | Buschhorn...................... | 70/230 |
| 2,791,898 | 5/1957 | Pegg et al. ..................... | 70/230 |
| 2,912,847 | 11/1959 | Putman et al.................. | 70/232 |
| 3,410,122 | 11/1968 | Moses .......................... | 70/58 |

Primary Examiner—Albert G. Craig, Jr.
Attorney—Warren D. Flackbert

ABSTRACT: A locking arrangement having particular adaptability for use in preventing the theft of communication equipment from a vehicle characterized by hollow side members having keyway portions for selectively receiving and covering the bolts normally used to secure the communication equipment to a mounting bracket, and arms on each hollow side member pivotal to a locking position and maintained in such position by a conventional lock. In an alternative invention embodiment, a chain and lock, in tension, maintain the aforesaid hollow side members in an antitheft position.

INVENTOR
JOHN E. LEEPER
BY Warren D. Hackbert
ATTORNEY

LOCKING ARRANGEMENT

As is known, it is customary to use specialized removable communication equipment in a vehicle, such as a citizen band transmitter and receiver, a tape cartridge unit or the like. A serious problem has arisen, however, in the high frequency of theft of such equipment. Obviously, such theft not only creates unnecessary expense for the owner, but, as well, represents a loss of time, and the interruption of a function provided by the equipment, as, for example, in a business activity.

The invention provides an antitheft arrangement for communication equipment, although, it should be understood, the principles of the invention are adaptable into other areas. Briefly, and as is known, a mounting bracket is normally secured to the undersurface of the dashboard of the vehicle. The communication equipment is mounted onto such mounting bracket typically by bolts having an enlarged head portion. The invention provides hollow side members having a top wall, a bottom wall and side and end walls, where one of the sidewalls of each side member has keyways disposed therein.

The keyways are adapted to receive the aforesaid positioning bolts in the larger portion of each, and the hollow side members are then moved rearwardly so that the stem of each of the bolt members is in the smaller portion of the keyways. Pivotal arms, chains, or the like, are adapted to secure the side members together in a locked position. It should be understood, therefore, that theft is made virtually impossible in that the aforesaid positioning bolts are covered and not accessible, being retained in a locked or antitheft position.

A better understanding of the present invention will become more apparent from the following description, taken in conjunction with the accompany drawings, wherein FIG. 1 is a view in side elevation, partly in vertical section and partly fragmentary, showing the invention in a typical installation;

Figure 1:
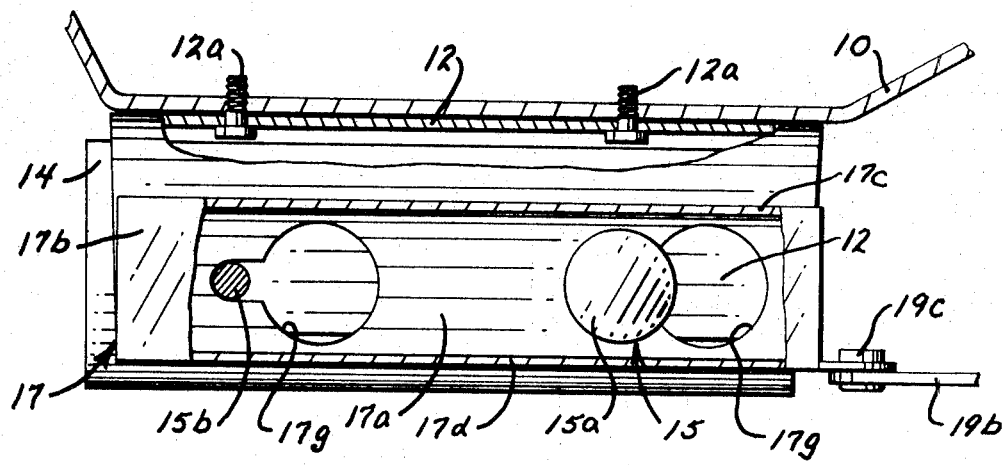

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 3:
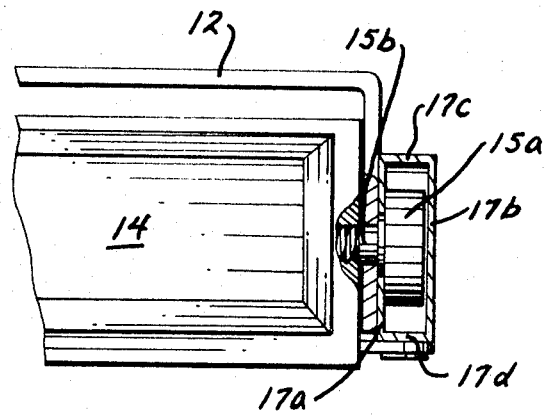
FIG. 3 is a view in front elevation, partly broken away and partly in vertical section, showing still further details of the invention; and, FIG. 4 is a view in rear elevation showing an alternative invention embodiment which employs a lock and chain.
Figure 2:
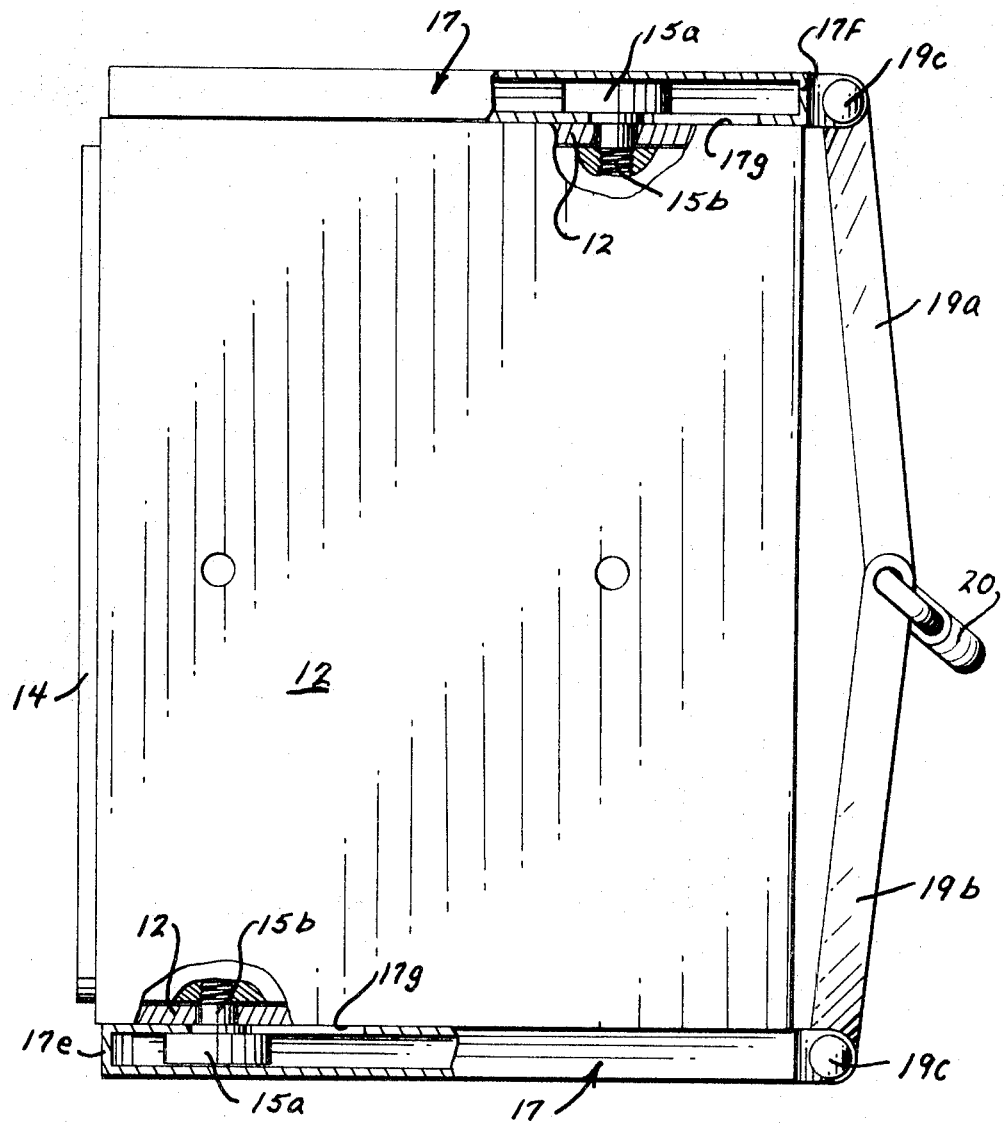
FIG. 2 is a top plan view of the invention, with the representation of the undersurface of the dashboard of FIG. 1 removed.

Referring now to FIGS. 1, 2 and 3, the invention is shown in combination with the undersurface of a dashboard 10 of a vehicle, such as an automobile, for example. A mounting member or bracket 12 is secured to such dashboard 10 by threaded members 12a, such as screws. The communication equipment 14 is typically positioned on the mounting bracket 12 through bolts 15, where usually two bolts 15 are on each side of such equipment 14. The bolts 15 each typically include an enlarged head portion 15a and a reduced diameter threaded stem portion 15b. As particularly evident from FIGS. 2 and 3, assembly is readily accomplished by threading the bolts 15 into the equipment 14 through openings in the depending portions 12a of mounting bracket 12.

The invention is represented by a hollow side member 17 disposed adjacent the depending portions 12a of the mounting bracket 12. The hollow side members 17 are each typically defined by sidewalls 17a and 17b, top wall 17c, bottom wall 17d, front wall 17e and backwall 17f. Sidewall 17a, being the inner wall, includes two keyways 17g, as particularly evident in FIG. 1. The keyways 17g each are defined by an enlarged opening through which the head portion 15a of bolt 15 can pass and a narrow portion adapted to partially encircle the stem portion 15b of the bolts 15.

In other words, and with reference to FIG. 1, the head portions 15a of the bolt 15 are slipped into the enlarged portions of each keyway 17g and the hollow side members 17 moved to the right (in FIG. 1) so that the stem portions 15b of the bolts 15 are in the narrow portion of the keyway 17g. The preceding position represents a locked or antitheft position.

In order to maintain the desired locking action, the invention is provided with arms 19a and 19b pivotal at 19c on hollow side members 17. The pivotal arms 19a and 19b each have an opening at the free end thereof to receive a lock 20, such as a conventional padlock. In other words, the dimensioning is such that, upon locking, the hollow side members 17 cannot be moved and the bolts 15 remain in a concealed position, secured against prying or other interference incident to theft. It should be understood that the locking arrangement of the invention provides a pleasing appearance, and once positioned, does not have to be removed unless, for example, the communication equipment requires repairing, replacement or removal, by the owner.

Figure 4:
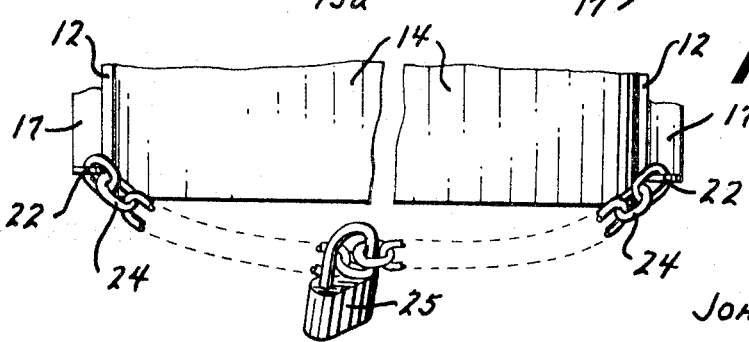

In the invention embodiment of FIG. 4, upstanding tabs 22 may be secured to each hollow side member 17, where a chain 24 and associated locking device, such as a padlock 25, maintained in tension, prevent any movement of the hollow side members 17 from the aforesaid locking position.

From the preceding, it should be apparent that the invention defines a positive approach for locking equipment through the employment of hollow members which, when in a locking position, cover and make inaccessible the mounting bolts for the equipment involved. As stated, the invention is adaptable for use in other types of installations and thus the preceding description should be considered illustrative.

I claim:

1. An antitheft device for equipment positioned on a mounting member by fastening means comprising a hollow member extending along each of two opposite sides of said mounting member and having an inner wall with a keyway, said fastening means having an enlarged portion which is passable through an enlarged portion of said keyway and into the interior of said hollow member, and a stem which is lockingly received within a narrow portion of said keyway when each hollow member is moved, and means locking together said hollow members for securing them in the latter position.

2. The device of claim 1 where said locking means are pivotal arms secured together by a locking device.

3. The device of claim 1 where said locking means are chains and a locking device.

4. The device of claim 1 where said mounting member is a bracket having depending portions, and where said hollow members are in engagement with said depending portions.